(12) United States Patent
Iwamoto

(10) Patent No.: US 8,542,305 B2
(45) Date of Patent: Sep. 24, 2013

(54) IMAGING DEVICE HAVING DISPLAY BRIGHTNESS CONTROL FUNCTION

(75) Inventor: Kenji Iwamoto, Kokubunji (JP)

(73) Assignee: Casio Computer Co., Ltd., Tokyo (JP)

( * ) Notice: Subject to any disclaimer, the term of this patent is extended or adjusted under 35 U.S.C. 154(b) by 1363 days.

(21) Appl. No.: 12/079,618

(22) Filed: Mar. 27, 2008

(65) Prior Publication Data

US 2008/0266239 A1 Oct. 30, 2008

(30) Foreign Application Priority Data

Mar. 30, 2007 (JP) .................. 2007-092103

(51) Int. Cl.
*H04N 5/222* (2006.01)
*H04N 5/225* (2006.01)
*G09G 3/36* (2006.01)
*G03B 13/02* (2006.01)

(52) U.S. Cl.
USPC ....... 348/333.01; 345/102; 396/374; 348/341

(58) Field of Classification Search
USPC ................ 396/89–152, 373–386, 280–296; 345/102, 169, 173–178; 348/341, 333.09
See application file for complete search history.

(56) References Cited

U.S. PATENT DOCUMENTS

| | | | |
|---|---|---|---|
| 5,805,201 A * | 9/1998 | Fujiwara ................ 348/818 |
| 6,674,964 B2 | 1/2004 | Irie |
| 7,738,025 B2 * | 6/2010 | Nonaka .................. 348/333.13 |
| 2001/0020989 A1 * | 9/2001 | Nakayama .............. 349/61 |
| 2004/0145663 A1 * | 7/2004 | Nishio et al. ........... 348/239 |
| 2005/0275847 A1 * | 12/2005 | Moshe ................... 356/456 |
| 2006/0239670 A1 * | 10/2006 | Cleveland ............... 396/51 |
| 2006/0274161 A1 * | 12/2006 | Ing et al. ................ 348/229.1 |
| 2007/0203613 A1 * | 8/2007 | Huang et al. ........... 700/245 |

FOREIGN PATENT DOCUMENTS

| JP | 04009998 A | * | 1/1992 |
|---|---|---|---|
| JP | 5-045671 U | | 6/1993 |
| JP | 06105191 A | * | 4/1994 |
| JP | 7-303202 A | | 11/1995 |
| JP | 8-242398 A | | 9/1996 |
| JP | 2002-345756 A | | 12/2002 |
| JP | 2003-309746 A | | 10/2003 |
| JP | 2003309746 A | * | 10/2003 |
| JP | 2004-186721 A | | 7/2004 |
| JP | 2004-215062 A | | 7/2004 |
| JP | 2007-041150 A | | 2/2007 |
| JP | 2007-067889 A | | 3/2007 |

OTHER PUBLICATIONS

Japanese Office Action dated May 10, 2011 (and English translation thereof) in counterpart Japanese Application No. 2007-092103.

* cited by examiner

*Primary Examiner* — Alexander S Beck
*Assistant Examiner* — Nguyen H Truong
(74) *Attorney, Agent, or Firm* — Holtz, Holtz, Goodman & Chick, PC

(57) ABSTRACT

A control unit controls brightness of a liquid crystal display unit such that the brightness becomes darker as a distance between an electronic view finder and an operator measured by a distance measuring sensor becomes shorter. With this structure, even if the operator takes his or her eye off from the electronic view finder, the liquid crystal display unit is not switched from an OFF state to an ON state. Therefore, it is possible to prevent the brightness of the liquid crystal display unit from becoming burdensome to an operator when the eye of the operator approaches the electronic view finder.

11 Claims, 6 Drawing Sheets

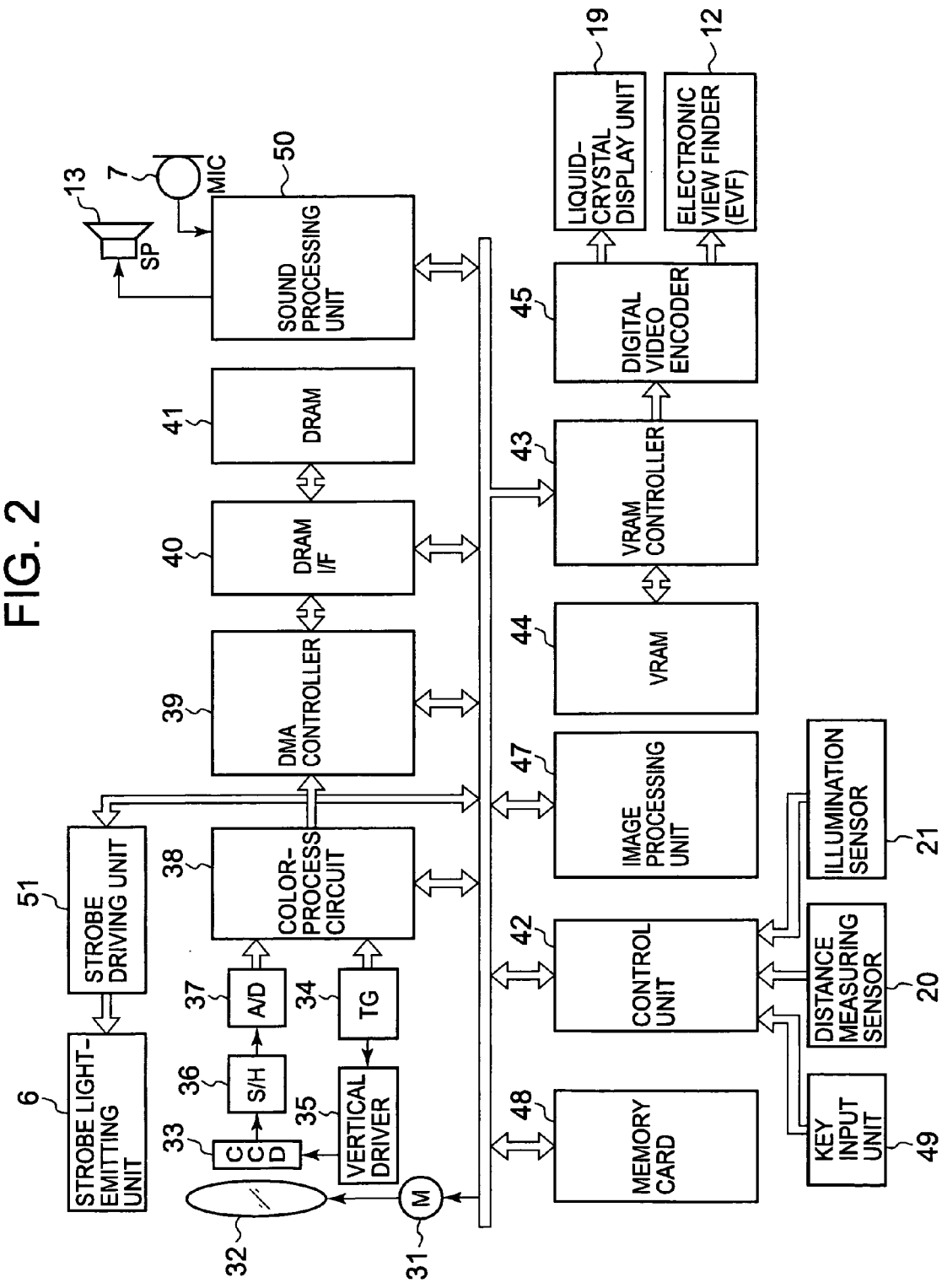

IMAGING DEVICE HAVING DISPLAY BRIGHTNESS CONTROL FUNCTION

CROSS REFERENCE TO RELATED APPLICATIONS

This application is based upon and claims the benefit of priority from a Japanese Patent Application No. TOKUGAN 2007-92103, filed on Mar. 30, 2007; the entire contents of which are incorporated herein by reference.

BACKGROUND OF THE INVENTION

1. Field of the Invention

The present invention relates to an imaging device and a display brightness control method, which can be used for a digital camera having a display brightness control function.

2. Description of the Related Art

In an imaging device having a display unit near an ocular finder, there is a known imaging device in which when illumination detected by an illumination sensor disposed near the finder is equal to or lower than a predetermined value, it is determined that an eye of an operator is in contact with the finder, and the display unit is switched from an ON state to an OFF state. According to such an imaging device, when the eye is in contact with the finder, as the display unit is brought into the OFF state and becomes dark, it is possible to prevent the brightness of the display unit from becoming burdensome to the operator.

According to the conventional imaging device, however, as the display unit is switched between ON and OFF corresponding to whether the illumination detected by the illumination sensor is equal to or lower than a predetermined value, the display unit is switched from the OFF state to the ON state even if the operator slightly takes his or her eye off the finder, and the brightness of the display unit becomes burdensome to the operator in some cases.

The present invention has been achieved in order to solve the above problems, and an object of the invention is to provide an imaging device and a display brightness control method capable of preventing the brightness of the display unit from becoming burdensome to an operator when the operator brings his or her eye close to the finder.

SUMMARY OF THE INVENTION

One aspect of the present invention provides an imaging device that includes an ocular finder, a display unit provided near the finder, a distance measuring unit that measures a distance between the finder and an operator, and a control unit that controls brightness of the display unit such that the brightness becomes darker as the distance measured by the distance measuring unit becomes shorter.

Another aspect of the present invention provides an imaging device that includes an ocular finder, a display unit provided near the finder, an illumination detecting unit that detects illumination around the finder, and a control unit that controls brightness of the display unit such that the brightness becomes darker in stages as the illumination detected by the illumination detecting unit becomes lower.

Still another aspect of the present invention provides a display brightness control method of an imaging device including an ocular finder, a display unit provided near the finder, and a distance measuring unit that measures a distance between the finder and an operator, comprising: a distance measuring step of measuring the distance between the finder and the operator; and a control step of controlling brightness of the display unit such that the brightness becomes darker as the distance measured in the distance measuring step becomes shorter.

Still another aspect of the present invention provides a recording medium having recorded therein a computer program of an imaging device including an ocular finder, a display unit provided near the finder, and a distance measuring unit that measures a distance between the finder and an operator, the computer program being executed by a computer incorporated in the imaging device, wherein the computer is caused to execute processing for controlling brightness of the display unit such that the brightness becomes darker as the distance measured by the distance measuring unit becomes shorter.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 1A is a perspective view mainly showing a structure of a front surface of the camera and FIG. 1B is a perspective view mainly showing a structure of a back surface of the camera;

FIG. 2 is a block diagram showing a structure of a control system of the digital still camera shown in FIGS. 1A and 1B;

DETAILED DESCRIPTION OF THE PREFERRED EMBODIMENTS

An embodiment of a digital still camera according to the present invention will be explained with reference to the drawings.

[Entire Structure]

Figure 1A:
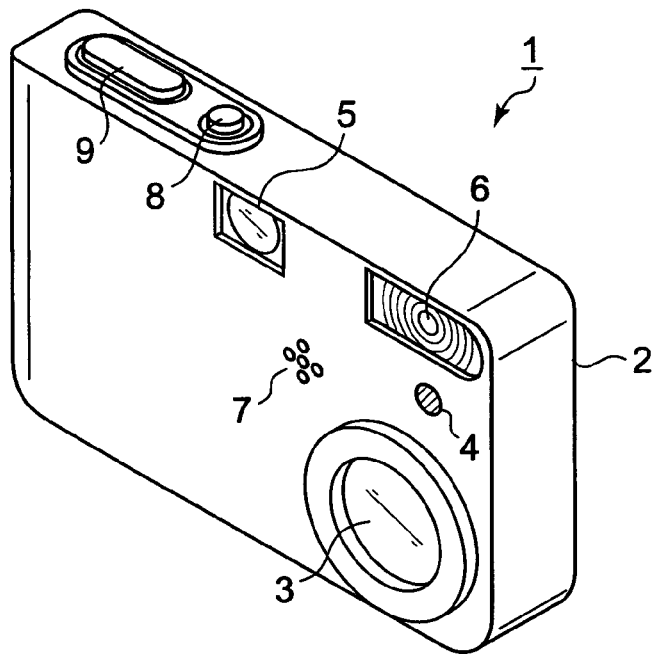
FIGS. 1A and 1B are perspective views of a structure of a digital still camera according to an embodiment of the present invention, where

As shown in FIG. 1A, a digital still camera 1 according to one embodiment of the present invention includes an imaging lens 3, a self timer lamp 4, a finder window 5, a strobe light-emitting unit 6 and a microphone 7 all provided on a front surface of a substantially rectangular thin plate-like body (hereinafter, "body") 2. The body 2 is provided at its right end of an upper surface (for an operator) with a power supply key 8 and a shutter key 9. The imaging lens 3 has a zoom function for changing a focal length continuously, and an AF (Auto Focus) function. The imaging lens 3 is retracted into the body 2 when the power supply is OFF and at the time of a reproduction mode. The power supply key 8 is operated for turning the power supply ON and OFF, and the shutter key 9 instructs an imaging timing at the time of an imaging mode.

Figure 1B:
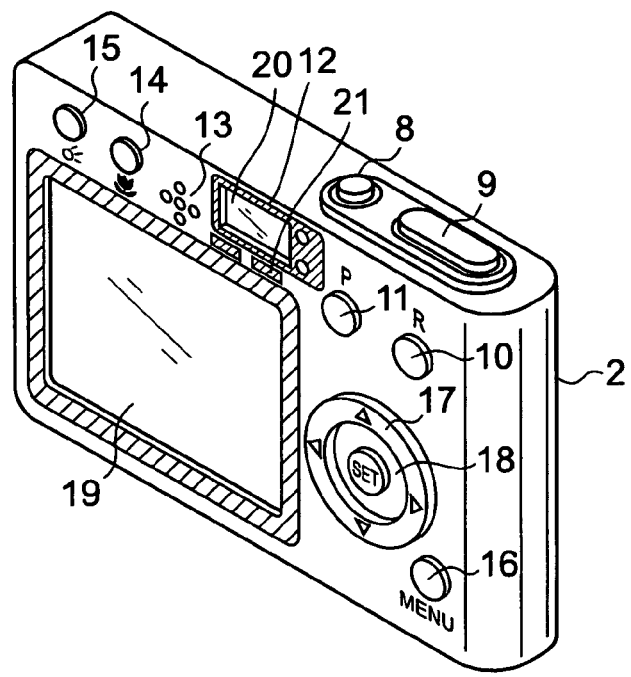

As shown in FIG. 1B, the body 2 is provided at its back surface with an imaging mode (R) key 10, a reproduction mode (P) key 11, an electronic view finder (hereinafter, EVF) 12, a speaker 13, a macro key 14, a strobe key 15, a menu (MENU) key 16, a ring key 17, a set (SET) key 18, a liquid-crystal display unit 19, a distance measuring sensor 20, and an illumination sensor 21. If the imaging mode key 10 is operated from the power supply OFF state, the power supply is automatically turned ON and the mode is shifted to the imaging mode of a still image. On the other hand, if the imaging mode key 10 is repeatedly operated from the power supply ON state, the imaging mode of still image and moving image is set cyclically.

If the reproduction mode key 11 is operated from the power supply OFF state, the power supply is automatically turned ON and the mode is shifted to the reproduction mode. The EVF 12 is an ocular finder using a liquid crystal screen. The EVF 12 displays a through image on the liquid crystal screen at the time of the imaging mode, and reproduces a selected image at the time of reproduction mode. The macro key 14 is operated when switching between a normal imaging mode and a macro imaging mode in the imaging mode of still image. The strobe key 15 is operated when switching the light emitting mode of the strobe light-emitting unit 6. The menu key 16 is operated when selecting various menu items. The ring key 17 is integrally formed with item selecting keys in vertical and lateral directions. The set key 18 located at a central portion of the ring key 17 is operated when setting an item which is currently selected.

The liquid-crystal display unit 19 includes a color liquid crystal panel with backlighting. The liquid-crystal display unit 19 displays a through image on a monitor at the time of the imaging mode, and reproduces a selected image at the time of reproduction mode. The distance measuring sensor 20 includes a known distance measuring device such as a phase contrast sensor, a capacitance distance measuring sensor and a pupil detection (an eye-detection) sensor, and detects a distance D between the EVF 12 (the body 2) and an operator. When the distance measuring sensor 20 is the pupil detection sensor, the pupil detection sensor detects a size of a pupil (eye) of an operator and measures a distance D between the EVF 12 and the operator based on the size of the detected pupil. The illumination sensor 21 detects an illumination around the body 2. The digital still camera 1 is provided at its bottom with a memory card slot into and from which a memory card used as a recording medium is attached to detached, and an USB (Universal Serial Bus) connector as a serial interface connector to be connected to an external personal computer (both not shown).

[Structures of Imaging System and Control System]

FIG. 2 is a schematic block diagram showing an electrical structure of the digital still camera 1 according to the embodiment.

In the digital still camera 1, a focus position and an iris position are moved by a motor (M) 31 at the time of imaging mode. A CCD 33 is an imaging element disposed behind an imaging optical axis of a lens optical system 32 constituting the imaging lens 3. The CCD 33 is driven to scan by a timing generator (TG) 34 and a vertical driver 35, and outputs a photoelectric conversion output corresponding to a formed optical image by one screen every constant period. The photoelectric conversion output is appropriately gain-adjusted every primary color component of RGB in analogue signal state and then, the photoelectric conversion output is sample-held by a sample hold circuit (S/H) 36. A sample-held signal is converted into digital data by an A/D converter 37 and then, it is subjected to color-process processing including pixel interpolation processing and γ correction processing, by a color-process circuit 38. The color-process circuit 38 produces a brightness signal Y of digital value and color-difference signals Cb and Cr, and outputs produced signals to a DMA (Direct Memory Access) controller 39.

The DMA controller 39 once writes the brightness signal Y and the color-difference signals Cb and Cr which are output by the color-process circuit 38 into a buffer in the DMA controller 39 using a composite synchronous signal, a memory writing enable signal and a clock signal from the color-process circuit 38, and DMA-transfers the same (the brightness signal Y and the color-difference signals Cb and Cr) to a DRAM 41 used as a buffer memory through the DRAM interface (I/F) 40. A control unit 42 includes a CPU, a ROM in which a computer program executed by the CPU including brightness control processing is stored, and a RAM used as a work memory, and controls the operation of the entire digital still camera 1.

After the DMA transfer of brightness and color-difference signal to the DRAM 41, the control unit 42 reads the brightness and the color-difference signal from the DRAM 41 through the DRAM interface 40, and writes the same in the VRAM 44 through a VRAM controller 43. A digital video encoder 45 periodically reads the brightness and the color-difference signal from the VRAM 44 through the VRAM controller 43, generates a video signal based on these data sets, and outputs the video signal to the EVF 12 and the liquid-crystal display unit 19. The EVF 12 and the liquid-crystal display unit 19 display an image based on the video signal from the digital video encoder 45, and display an image based on image information captured from the VRAM controller 43 at that time in real time.

An image at that time is displayed on the EVF 12 and the liquid-crystal display unit 19 as a monitor image in real time. If the shutter key 9 is operated at timing at which it is desired to take a still image in a so-called through image displayed state, a trigger signal is generated. The control unit 42 stops the DMA transfer to the DRAM 41 of the brightness and the color-difference signal of one screen captured from the CCD 33 at the timing the trigger signal is generated, and drives the CCD 33 with an iris value and a shutter speed corresponding to appropriate exposure condition. The control unit 42 obtains one screen brightness and a color-difference signal, and transfers the same (one screen brightness and a color-difference signal) to the DRAM 41. And then, the control unit 42 stops its path, and shifts the mode to a recording and storing state.

In this recording and storing state, the control unit 42 reads brightness and a color-difference signal of one frame written in the DRAM 41 by a unit called basic block of vertical 8 pixels×lateral 8 pixels per component of Y, Cb, and Cr through the DRAM interface 40, and writes the same in the image processing unit 47. The image processing unit 47 compresses data by processing such as ADCT (Adaptive Discrete Cosine Transform) and Huffman coding which is entropy coding. The obtained code data is then read from the image processing unit 47 as one image data file, and is written in one of a memory card 48 which is detachably attached as a recording medium of the digital still camera 1 and an embedded memory (not shown) incorporated in the digital still camera 1. If the compression of one frame brightness and color-difference signal and writing operation of all the compressed data sets into the memory card 48 or the embedded memory are completed, the control unit 42 again actuates the path from the CCD 33 to the DRAM 41.

The distance measuring sensor 20, the illumination sensor 21, a key input unit 49, a sound processing unit 50 and a strobe driving unit 51 are connected to the control unit 42. A distance D between the EVF 12 and an operator detected by the distance measuring sensor 20, and information of surrounding illumination detected by the illumination sensor 21 are sent directly to the control unit 42. The key input unit 49 includes the power supply key 8, the shutter key 9, the imaging mode key 10, the reproduction mode key 11, the macro key 14, the strobe key 15, the menu key 16, the ring key 17, and the set key 18, and signals generated by operations of these keys are sent directly to the control unit 42.

The sound processing unit 50 includes a sound source circuit such as a PCM sound source. The sound processing unit 50 digitalizes a sound signal which is input from the microphone 7 when sound is recorded. The sound processing unit 50 compresses digitalized data according to a predetermined data file format such as MP3 (MPEG-1 audio layer 3) to form a sound data file, and sends the sound data file to the memory card 48 or the embedded memory. On the other hand, the sound processing unit 50 decompresses the compressed sound data file sent from the memory card 48 or the embedded memory to convert the compressed sound data file into analog data when the sound is to be reproduced, and drives a speaker (SP) 13 to make the sound louder. The strobe driving unit 51 charges a large-capacity capacitor for strobe (not shown) when a still image is to be taken, and flashes the strobe light-emitting unit 6 based on control from the control unit 42.

When moving image is to be taken instead of a still image, a still image data file which is obtained by compressing the still image data by the image processing unit 47 is continuously recorded in the memory card 48 or the embedded memory while the shutter key 9 is kept operated. When the operation of the shutter key 9 is completed or a predetermined limited time, e.g., 30 seconds are elapsed, such a series still image data file is collectively set again as data file (AVI file) of motion JPEG. At the time of the reproduction mode which is the basic mode, the control unit 42 selectively reads image data recorded in the memory card 48 or the embedded memory, and the compressed image data is decompressed in the reversed procedure of the data-compressing procedure at the time of the imaging mode by image processing unit 4. The decompressed image data is stored in the DRAM 41 through the DRAM interface 40, and the contents stored in the DRAM 41 is stored in the VRAM 44 through the VRAM controller 43. The VRAM 44 periodically reads the image data and generates a video signal, and the EVF 12 and the liquid-crystal display unit 19 reproduces and outputs the video signal. When the selected image data is not a still image but a moving image, the individual still image data constituting the selected moving image file is continuously reproduced, and when the reproduction of all of the still image data sets is completed, only still image data located at the top is reproduced and displayed until next reproduction is instructed.

[Brightness Control Processing]

According to the digital still camera 1 having such a structure, if the control unit 42 executes brightness control processing described below, it is possible to prevent the brightness of the liquid-crystal display unit 19 from becoming burdensome to an operator when an eye of the operator approaches the EVF 12. The operation of the control unit 42 when the brightness control processing is carried out will be explained.

Figure 3:
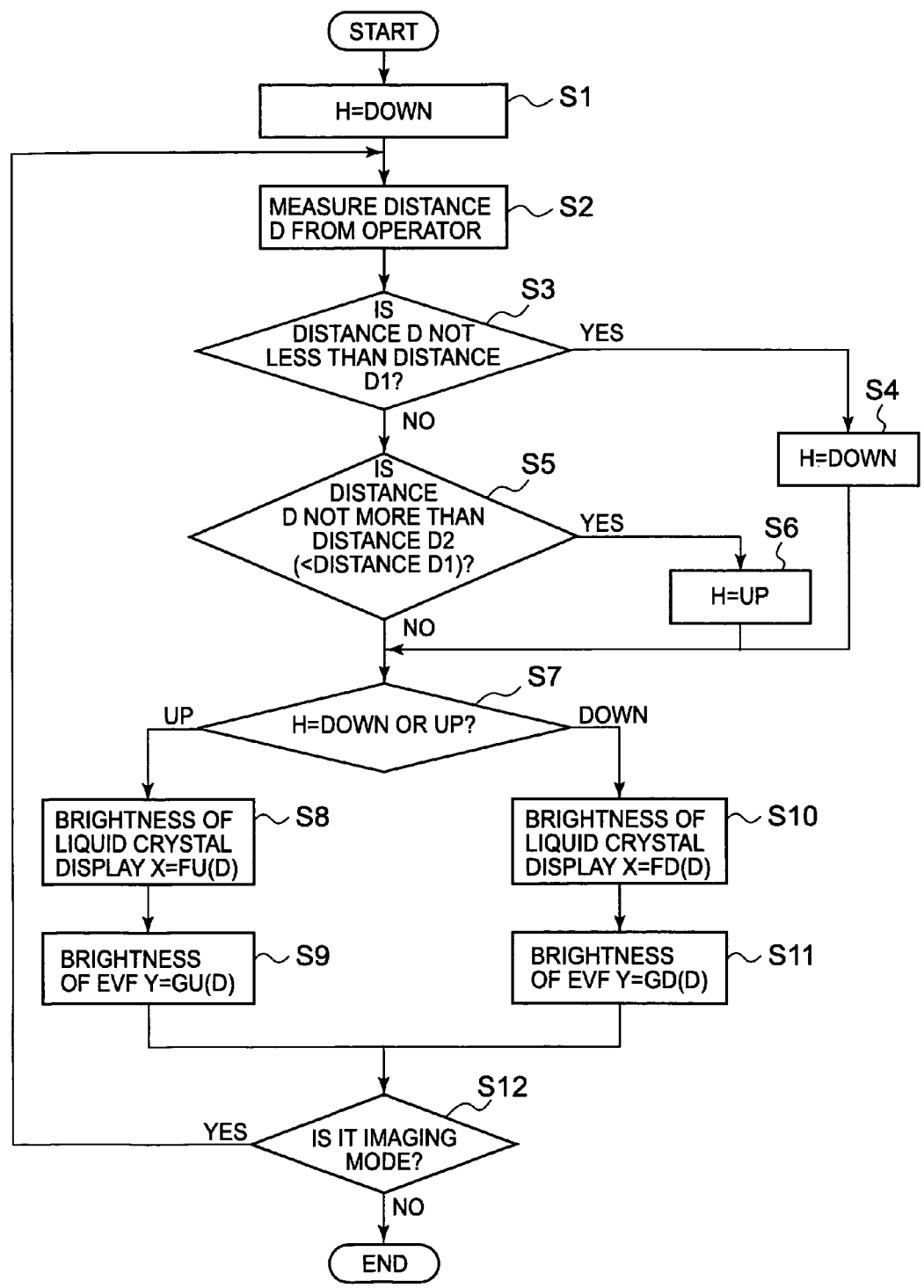
FIG. 3 is a flowchart of brightness control processing according to the embodiment.

The flowchart shown in FIG. 3 is started when the operation mode of the digital still camera 1 is shifted to the imaging mode, and the brightness control processing advances to the processing at step S1. In the present embodiment, the brightness control processing is carried out when the operation mode of the digital still camera 1 is shifted to the imaging mode, but the brightness control processing can be carried out when the operation mode of the digital still camera 1 is shifted to the reproduction mode. The operation of the control unit 42 shown below is realized when the CPU loads a computer program stored in the ROM to the RAM, and executes the loaded computer program.

In the processing at step S1, a value of a control parameter H indicative of a state of brightness of the liquid crystal screen of the EVF 12 is set to DOWN (reduction of brightness). In the present embodiment, when the operation mode of the digital still camera 1 is shifted to the imaging mode, it is assumed that an eye of an operator has not yet come into contact with the EVF 12, the value of the control parameter H is set to DOWN so that the liquid-crystal display unit 19 becomes brighter and the liquid crystal screen becomes darker, but the value of the control parameter H can be set to UP (increase brightness) so that the liquid-crystal display unit 19 becomes darker and the liquid crystal screen of the EVF 12 becomes brighter. With this process, the processing at step S1 is completed, and the brightness control processing advances to the processing at step S2.

In the processing at step S2, the control unit 42 obtains a distance D between the EVF 12 and an operator through the distance measuring sensor 20. With this process, the processing at step S2 is completed, and the brightness control processing advances to processing at step S3.

In the processing at step S3, the control unit 42 determines whether the distance D measured in the processing at step S2 is equal to or higher than a preset distance D1 (20 cm in the present embodiment). The value of the distance D1 can be a value which can be set by an operator through the key input unit 49, or a fixed value before shipping. When the distance D is equal to or higher than the distance D1 as a result of the determination, the control unit 42 holds the value of the control parameter H at DOWN as processing at step S4 and then, the brightness control processing is advanced to the processing at step S7. When the distance D is not equal to or higher than the distance D1, the control unit 42 advances the brightness control processing to processing at step S5.

In the processing at step S5, the control unit 42 determines whether the distance D measured in the processing at step S2 is equal to or lower than a distance D2 (a value equal to or lower than the distance D1, 4 cm in the present embodiment). The value of the distance D2 can be a value which can be set by an operator through the key input unit 49, or a fixed value before shipping. When the distance D is equal to or less than the distance D2 as a result of the determination, the control unit 42 changes the value of the control parameter H to UP as processing at step S6 and then, the brightness control processing is advanced to processing at step S7. If the distance D is not equal to or less than the distance D2, the control unit 42 brings the brightness control processing from the processing at step S5 to processing at step S7.

In the processing at step S7, the control unit 42 determines whether the value of the control parameter H is DOWN or UP. When the value of the control parameter H is UP as a result of the determination, the control unit 42 brings the brightness control processing to the processing at step S8. If the value of the control parameter H is DOWN, the control unit 42 brings the brightness control processing to the processing at step S10.

Figure 4:
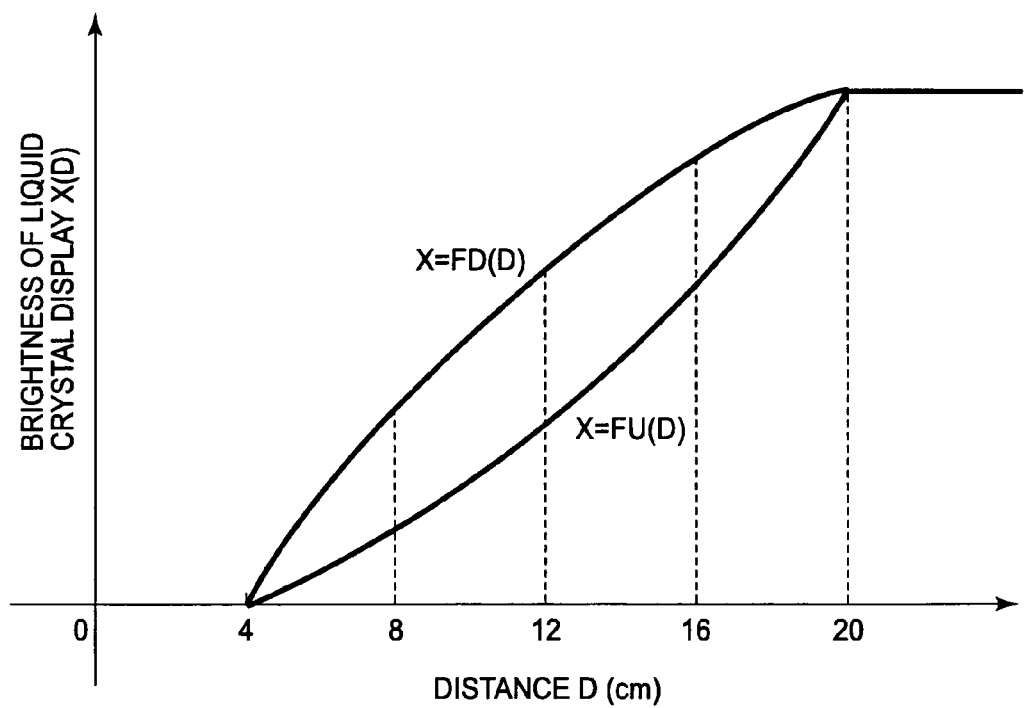
FIG. 4 shows one example of a relational expression between a distance and brightness used for brightness control of a liquid-crystal display unit.

In the processing at step S8, the control unit 42 calculates brightness X(D) by substituting a value of the distance D measured in the processing at step S2 for a control equation FU(D) shown in FIG. 4 in which brightness X becomes higher as the distance D becomes longer, and controls the brightness of the liquid-crystal display unit 19 such that the calculated brightness X(D) is obtained. In the present embodiment, as shown in FIG. 4, the control equation FU(D) is a relation equation between the distance D and the brightness X in which the brightness X becomes lower as the distance D becomes shorter and the brightness X becomes zero when the distance D is in a range of 0 to 4 cm. Therefore, by determining the brightness of the liquid-crystal display unit 19 according to the control equation FU(D), the brightness of the liquid-crystal display unit 19 is controlled such that the liquid-crystal display unit 19 becomes darker as the distance D becomes shorter. With this process, the processing at step S8 is completed, and the brightness control processing is advanced to processing at step S9.

Figure 5:
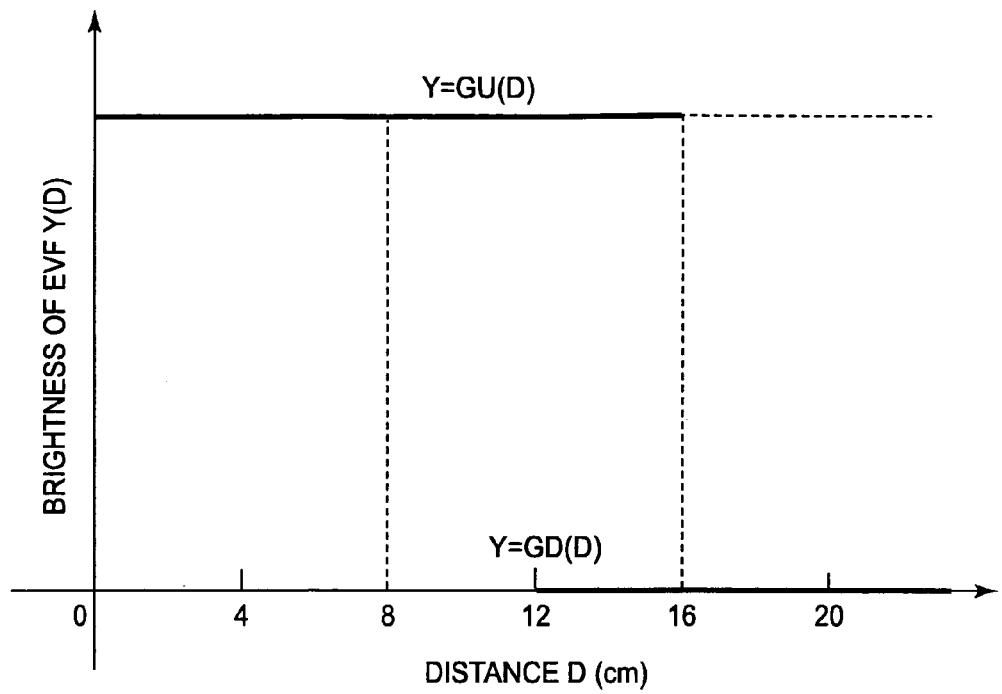
FIG. 5 shows one example of a relational expression between the distance and the brightness used for brightness control of an EVF.

In the processing at step S9, the control unit 42 calculates brightness Y(D) by substituting the distance D measured in the processing at step S2 for a control equation GU(D) indicative of a predetermined brightness value when the distance D is in a range of 0 to 16 cm as shown in FIG. 5, and controls the brightness of the liquid crystal screen of the EVF 12 such that the calculated brightness Y(D) is obtained. According to the control equation FU(D), the liquid crystal screen of the EVF 12 is controlled such that the liquid crystal screen is always in the ON state of the predetermined brightness value when the distance D between the EVF 12 and an operator is in a range of 0 to 16 cm. With this process, the processing at step S9 is completed, and the brightness control processing is advanced to processing at step S12.

In the processing at step S10, the control unit 42 calculates brightness X(D) by substituting a value of distance D measured by the processing at step S2 for the control equation FD(D) shown in FIG. 4 in which the brightness X becomes lower as the distance D becomes shorter, and controls the brightness of the liquid-crystal display unit 19 such that the calculated brightness X(D) is obtained. In the present embodiment, as shown in FIG. 4, the control equation FD(D) is a relation equation between the distance D and the brightness X in which the brightness is increased when the distance D is in a range of 4 to 20 cm and the brightness X becomes equal to a predetermined value when the distance D is 20 cm or higher. Therefore, the brightness of the liquid-crystal display unit 19 is controlled such that the liquid-crystal display unit 19 becomes brighter as the distance D becomes longer by determining the brightness of the liquid-crystal display unit 19 in accordance the control equation FD(D). With this process, the processing at step S10 is completed, and the brightness control processing is advanced to processing at step S11.

In the processing at step S11, the control unit 42 calculates the brightness Y(D) by substituting a value of the distance D measured in the processing at step S2 for the control equation GU(D) shown in FIG. 5 in which the brightness value becomes zero when the distance D is equal to or higher than 8 cm, and controls the brightness of the liquid crystal screen of the EVF 12 such that the calculated brightness Y(D) is obtained. According to the control equation FU(D), the brightness value of the liquid crystal screen of the EVF 12 always becomes zero and the liquid crystal screen is controlled in the OFF state when the distance D between the EVF 12 and an operator is 8 cm or higher. With this process, the processing at step S11 is completed, and the brightness control processing is advanced to processing at step S12.

In the processing at step S12, the control unit 12 determines whether the operation mode of the digital still camera 1 remains in the imaging mode. When the operation mode is the imaging mode as a result of the determination, the control unit 12 brings the brightness control processing back to the processing at step S2. When the operation mode is not the imaging mode any more, the control unit 12 completes the series of brightness control processing.

As apparent from the above explanation, according to the digital still camera 1 of the embodiment of the present invention, the control unit 42 controls the brightness of the liquid-crystal display unit 19 such that the liquid-crystal display unit 19 becomes darker as the distance D between the EVF 12 and an operator measured by the distance measuring sensor 20 becomes shorter. According to such a structure, the liquid-crystal display unit 19 is not switched from the OFF state to the ON state when the operator slightly takes his or her eye off from the EVF 12. Therefore, it is possible to prevent the brightness of the liquid-crystal display unit 19 from becoming burdensome to an operator and when the operator puts his or her eye closer to the EVF 12.

According to the digital still camera 1 of the embodiment of the present invention, the control unit 42 controls the brightness of the liquid-crystal display unit 19 using different control equations FD(D) and FU(D) when an eye of an operator approaches the EVF 12 and when the eye separates away from the EVF 12. Therefore, the brightness can be adjusted appropriately both when the distance D becomes shorter and when the distance D becomes longer.

Figure 6:
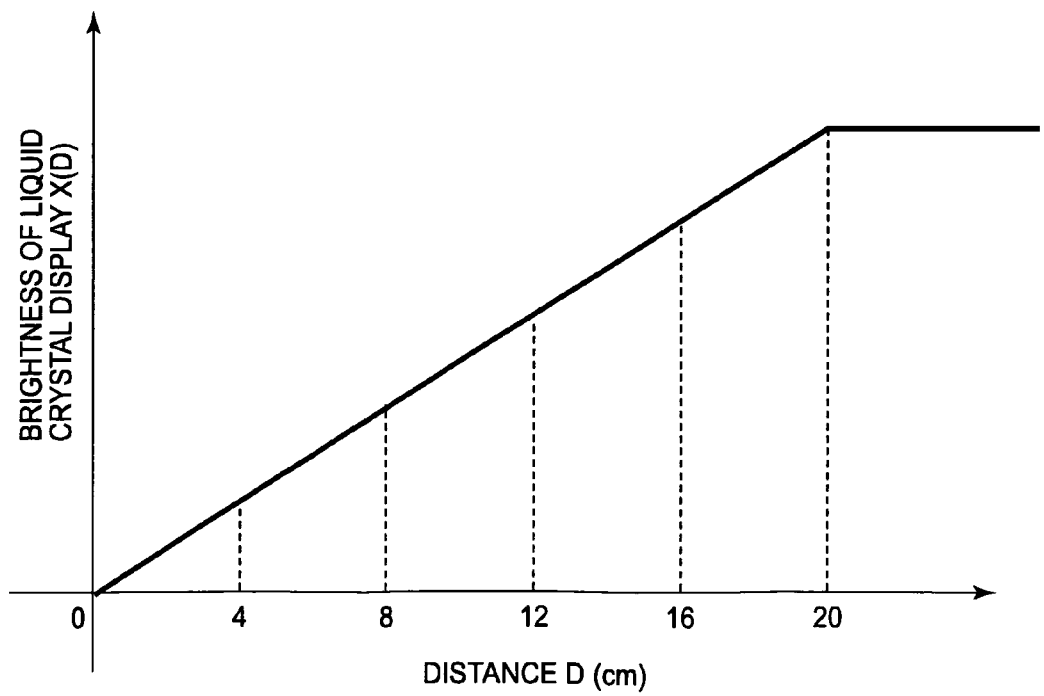
FIG. 6 shows another example of a relational expression between the distance and the brightness used for brightness control of the liquid-crystal display unit.
Figure 7:
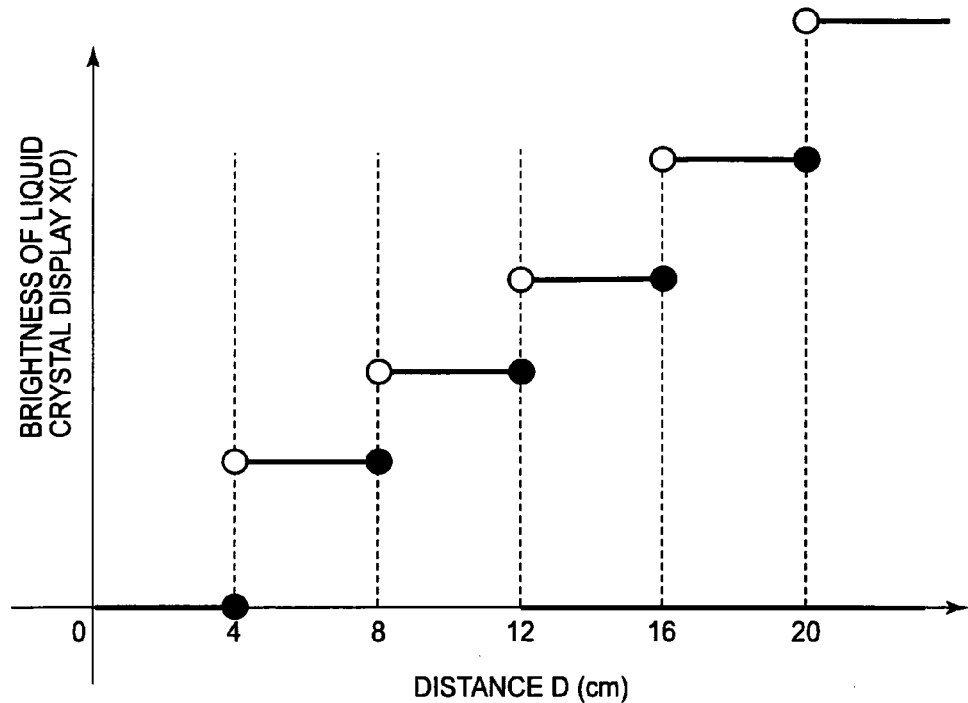
FIG. 7 shows still another example of a relational expression between the distance and the brightness used for brightness control of the liquid-crystal display unit.

The brightness of the liquid-crystal display unit 19 can be controlled using the same control equations as shown in FIGS. 6 and 7 both when the operator's eye approaches the EVF 12 and when the eye is separated away from the EVF 12. According to the control equation shown in FIG. 6, the brightness X is proportional to the distance D when the distance D is in a range of 0 to 20 cm, and the brightness X is the predetermined value when the distance D is in a range of 20 cm or longer. According to such a control equation, it is easy to control the brightness of the liquid-crystal display unit 19. According to the control equation shown in FIG. 7, the brightness X is varied in stages according to the distance. According to such a control equation, different visual effect can be given to an operator.

Descriptions have been made of the embodiment to which the invention created by the inventors of the present invention is applied. However, the present invention is not limited to the descriptions and the drawings, which form a part of the disclosure of the present invention according to the embodiment. When the brightness of the liquid-crystal display unit 19 is to be controlled, the surrounding illumination can be detected by the illumination sensor 21, and the brightness of the liquid-crystal display unit 19 can be controlled according to the detected illumination and the distance D measured by the distance measuring sensor 20. That is, in FIG. 4, when the surrounding illumination is high, the control equation X=FD(D) and X=FU(D) are varied such that the brightness X becomes higher than the brightness X shown in FIG. 4. And when the surrounding illumination is low, the control equation X=FD(D) and X=FU(D) are varied such that the brightness X becomes lower than the brightness X shown in FIG. 4. According to this control, it is possible to adjust the brightness of the liquid-crystal display unit 19 into the optimal value while taking the surrounding illumination into account. Although the brightness of the liquid-crystal display unit 19 is controlled in many stages in the present embodiment, the brightness can be controlled in one stage (ON/OFF only).

The brightness of the liquid-crystal display unit 19 can be adjusted by an operator through the key input unit 49. Although the entire brightness of the liquid-crystal display unit 19 is controlled according to the distance D in the present embodiment, the brightness of the liquid-crystal display unit 19 can be controlled partially (by each of areas of the liquid-crystal display unit 19), e.g., the brightness can be darkened from an upper side toward a lower side of the liquid-crystal display unit 19 as the distance D becomes shorter. Although the control unit 42 controls the brightness of the EVF 12 and the liquid-crystal display unit 19 according to the control equation in the present embodiment, the control unit 42 can control the brightness while referring a map table in which a brightness value corresponding to the distance D is defined.

Figure 8:
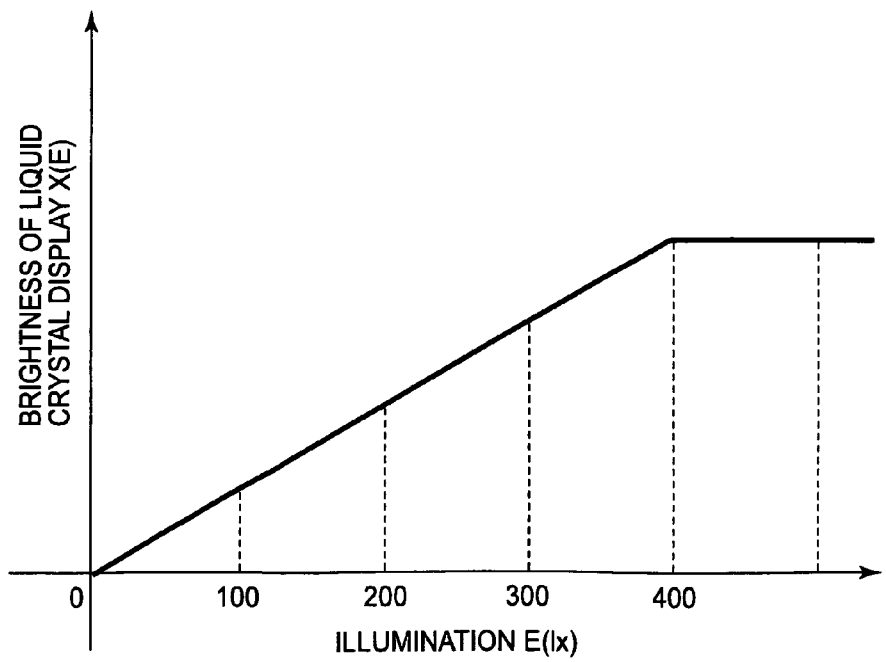
FIG. 8 shows one example of a relational expression between illumination and the brightness used for brightness control of the liquid-crystal display unit.

Further, the brightness X of the display unit is controlled according to the distance D measured by the distance measuring sensor 20 in the present embodiment. Instead of this, it is also possible to control the brightness X according to illumination E detected by the illumination sensor 21 as shown in FIG. 8.

All of other embodiments, examples, operational techniques and the like, which are made by those skilled in the art based on the above embodiment, are naturally incorporated in the scope of the present invention.

What is claimed is:

1. An imaging device comprising:
   an ocular finder;
   a display unit provided near the finder;
   a distance measuring unit that measures a distance between the finder and an operator; and
   a control unit that controls brightness of the display unit according to the distance measured by the distance measuring unit;
   wherein the control unit is configured to perform (i) a first brightness control such that the brightness becomes a first brightness value, (ii) a second brightness control such that the brightness becomes a second brightness value which is smaller than the first brightness value, and (iii) a third brightness control such that the brightness becomes darker in a continuous or stepwise manner between the first brightness value and the second brightness as the die measured by the distance measuring unit becomes shorter;
   wherein the control unit is configured such that:
   when the distance measured by the distance measuring unit is larger than a first threshold value, the control unit executes the first brightness control;
   when the distance measured by the distance measuring unit changes from being larger than the first threshold value to being between the first threshold value and a second threshold value which is smaller than the first threshold value, the control unit switches from the first brightness control to the third brightness control; and
   when the distance measured by the distance measuring unit changes from being between the first threshold value and the second threshold value to being smaller than the second threshold value, the control unit switches from the third brightness control to the second brightness control; and
   wherein the control unit controls the finder such that:
   in a state in which the control unit controls the brightness of the display unit to become darker as the distance measured by the distance measuring unit becomes shorter, the finder is in a display ON state of a given brightness value when the distance is smaller than a given threshold value, and the finder is in a display OFF state when the distance is equal to or larger than the given threshold value; and
   in a state in which the control unit controls the brightness of the display unit to become brighter as the distance measured by the distance measuring unit becomes longer, the finder is in a display ON state of a predetermined brightness value when the distance is equal to or less than a predetermined threshold value which is larger than the given threshold value, and the finder is in a display OFF state when the distance is larger than the predetermined threshold value.

2. The imaging device according to claim 1, wherein the control unit controls the brightness of the display unit using different processing between (i) when the distance measured by the distance measuring unit becomes shorter and (ii) when the distance measured by the distance measuring unit becomes longer.

3. The imaging device according to claim 2, wherein with respect to a predetermined distance measured by the distance measuring unit, the control unit controls the brightness of the display unit such that the brightness is different between (i) when the distance measured by the distance measuring unit becomes shorter to reach the predetermined distance and (ii) when the distance measured by the distance measuring unit becomes longer to reach the predetermined distance.

4. The imaging device according to claim 1, wherein the control unit controls the brightness of the display unit by a same processing both when the distance measured by the distance measuring unit becomes short and when the distance measured by the distance measuring unit becomes long.

5. The imaging device according to claim 1, further comprising an illumination sensor that detects surrounding illumination, wherein the control unit controls the brightness of the display unit based on both the distance measured by the distance measuring unit and the illumination detected by the illumination sensor.

6. The imaging device according to claim 1, wherein the control unit controls the brightness of an entirety of the display unit according to the distance measured by the distance measuring unit.

7. The imaging device according to claim 1, wherein the control unit independently controls the brightness of the display unit according to the distance measured by the distance measuring unit for each of areas of the display unit.

8. The imaging device according to claim 1, wherein the distance measuring unit includes a sensor that detects a size of a pupil of the operator, and the distance between the finder and the operator is measured based on the detected size of the pupil.

9. A display brightness control method for an imaging device including an ocular finder, a display unit provided near the finder, and a distance measuring unit that measures a distance between the finder and an operator, the method comprising:
   measuring the distance between the finder and the operator; and
   controlling brightness of the display unit according to the measured distance;
   wherein the controlling comprises (i) a first brightness control such that the brightness becomes a first brightness value, (ii) a second brightness control such that the brightness becomes a second brightness value which is smaller than the first brightness value, and (iii) a third brightness control such that the brightness becomes darker in a continuous or stepwise manner between the first brightness value and the second brightness as the measured distance becomes shorter;

wherein when the measured distance is larger than a first threshold value, the first brightness control is performed;

wherein when the measured distance changes from being larger than the first threshold value to being between the first threshold value and a second threshold value which is smaller than the first threshold value, the control switches from the first brightness control to third brightness control;

wherein when the measured distance changes from being between the first threshold value and the second threshold value to being smaller than the second threshold value, the control switches from the third brightness control to the second brightness control;

wherein in a state in which the brightness of the display unit is controlled to become darker as the distance measured by the distance measuring unit becomes shorter, the finder is controlled to be in a display ON state of a given brightness value when the distance is smaller than a given threshold value, and the finder is controlled to be in a display OFF state when the distance is equal to or larger than the given threshold value; and wherein in a state in which the brightness of the display unit is controlled to become brighter as the distance measured by the distance measuring unit becomes longer, the finder is controlled to be in a display ON state of a predetermined brightness value when the distance is equal to or less than a predetermined threshold value which is larger than the given threshold value, and the finder is controlled to be in a display OFF state when the distance is larger than the predetermined threshold value.

10. A non-transitory recording medium having recorded therein a computer program for an imaging device including an ocular finder, a display unit provided near the finder, and a distance measuring unit that measures a distance between the finder and an operator, the computer program being executed by a computer incorporated in the imaging device to perform functions comprising:

operating the distance measuring unit to measure the distance between the finder and the operator; and controlling brightness of the display unit according to the distance measured by the distance measuring unit;

wherein the controlling comprises (i) a first brightness control such that the brightness becomes a first brightness value, (ii) a second brightness control such that the brightness becomes a second brightness value which is smaller than the first brightness value, and (iii) a third brightness control such that the brightness becomes darker in a continuous or stepwise manner between the first brightness value and the second brightness as the distance measured by the distance measuring unit becomes shorter;

wherein when the distance measured by the distance measuring unit is larger than a first threshold value, the first brightness control is performed;

wherein when the distance measured by the distance measuring unit changes from being larger than the first threshold value to being between the first threshold value and a second threshold value which is smaller than the first threshold value, the control switches from the first brigs control to the third brightness control;

wherein when the distance measured by the distance measuring unit changes from being between the first threshold value and the second threshold value to being smaller than the second threshold value, the control switches from the third brightness control to the second brightness control;

wherein in a state in which the brightness of the display unit is controlled to become darker as the distance measured by the distance measuring unit becomes shorter, the finder is controlled to be in a display ON state of a given brightness value when the distance is smaller than a given threshold value, and the finder is controlled to be in a display OFF state when the distance is equal to or larger than the given threshold value; and wherein in a state in which the brightness of the display unit is controlled to become brighter as the distance measured by the distance measuring unit becomes longer, the finder is controlled to be in a display ON state of a predetermined brightness value when the distance is equal to or less than a predetermined threshold value which is larger than the given threshold value, and the finder is controlled to be in a display OFF state when the distance is larger than the predetermined threshold value.

11. The imaging device according to claim 1, wherein the control unit is configured to perform a fourth brightness control such that the brightness becomes brighter in a continuous or stepwise manner as the distance measured by the distance measuring unit becomes longer.

* * * * *

UNITED STATES PATENT AND TRADEMARK OFFICE
CERTIFICATE OF CORRECTION

| | | |
|---|---|---|
| PATENT NO. | : 8,542,305 B2 | Page 1 of 1 |
| APPLICATION NO. | : 12/079618 | |
| DATED | : September 24, 2013 | |
| INVENTOR(S) | : Kenji Iwamoto | |

It is certified that error appears in the above-identified patent and that said Letters Patent is hereby corrected as shown below:

In the Claims

Column 9, line 42 (Claim 1, line 17):

delete "die" and insert --distance--.

Column 11, line 7 (Claim 9, line 25):

delete "to" and insert --to the--.

Column 12, line 16 (Claim 10, line 30):

delete "brigs" and insert --brightness--.

Signed and Sealed this
Fifteenth Day of April, 2014

Michelle K. Lee
*Deputy Director of the United States Patent and Trademark Office*